US012546457B1

(12) United States Patent
Zhang

(10) Patent No.: US 12,546,457 B1
(45) Date of Patent: Feb. 10, 2026

(54) PROJECTING DECORATION

(71) Applicant: GEMMY INDUSTRIES CORPORATION, Coppell, TX (US)

(72) Inventor: Cheng-Chun Zhang, Shenzhen (CN)

(73) Assignee: Gemmy Industries Corporation, Coppell, TX (US)

( * ) Notice: Subject to any disclaimer, the term of this patent is extended or adjusted under 35 U.S.C. 154(b) by 0 days.

(21) Appl. No.: 18/795,953

(22) Filed: Aug. 6, 2024

(51) Int. Cl.
*F21V 11/08* (2006.01)
*F21S 6/00* (2006.01)
*F21V 3/02* (2006.01)
*F21V 3/10* (2018.01)
*F21V 33/00* (2006.01)
*H05B 47/155* (2020.01)

(52) U.S. Cl.
CPC ............... *F21V 11/08* (2013.01); *F21S 6/005* (2013.01); *F21V 3/026* (2013.01); *F21V 3/10* (2018.02); *F21V 33/0056* (2013.01); *H05B 47/155* (2020.01)

(58) Field of Classification Search
CPC . F21V 11/08; F21V 3/10; F21V 3/026; F21V 33/0056; F21S 6/005; H05B 47/155
See application file for complete search history.

(56) References Cited

U.S. PATENT DOCUMENTS 8,550,658 B2 * 10/2013 Hansler ..................... B64F 1/20 362/276
2002/0101571 A1 * 8/2002 Panasewicz ........ F21V 21/0824 353/119
2007/0047215 A1 * 3/2007 Egami ..................... G09F 19/12 362/23.15
2007/0230170 A1 * 10/2007 Mita ....................... G09F 13/04 362/812
2011/0133672 A1 * 6/2011 Tsang ........................ F21V 9/40 315/294
2017/0159924 A1 * 6/2017 Khubani ............... F21S 10/023
(Continued)

FOREIGN PATENT DOCUMENTS

WO WO-8902638 A1 * 3/1989 ............ F21V 14/003

OTHER PUBLICATIONS

English Machine Translation of WO8902638 provided by Espacenet (Year: 1989).*

*Primary Examiner* — Zheng Song
(74) *Attorney, Agent, or Firm* — KLEINBERG & LERNER, LLP; Marshall A. Lerner; Brad E. Mattes

(57) ABSTRACT

A projecting decoration comprises an outer shell, a light assembly, a light-blocking cover and a controller. The light assembly is mounted inside the outer shell. The light-blocking cover is mounted at the light assembly and has multiple hollowed-out graphic portions, which respectively correspond to multiple light units of the light assembly. The controller is electrically connected to and controls each light unit to emit light, which passes through corresponding hollowed-out graphic portion of the light-blocking cover to light up and project a projected figure to the outer shell. Because the controller controls a part of the multiple light units to turn on and another part to turn off, the outer shell shows various projected figures of different hollowed-out graphic portions corresponding to different light units, thereby enhancing a decorative effect of projecting decoration and inciting a sense of surprise and fun.

14 Claims, 22 Drawing Sheets

(56) References Cited

U.S. PATENT DOCUMENTS

| | | | | |
|---|---|---|---|---|
| 2018/0231201 | A1* | 8/2018 | Heim | F21S 9/037 |
| 2021/0372596 | A1* | 12/2021 | Wang | F21S 10/02 |
| 2022/0108614 | A1* | 4/2022 | Mori | G08G 1/005 |

* cited by examiner

PROJECTING DECORATION

BACKGROUND OF THE INVENTION

1. Field of the Invention

The present invention relates to a projecting decoration, especially to a decoration having an outer shell with a light assembly and a light-blocking cover mounted inside. When the light assembly emits light, the light passes through the light-blocking cover to project projected figures to the outer shell and light up the outer shell for decorating.

2. Description of Related Art

With the improvement of life quality, people pay more attention to the festive atmosphere. Hence, decorations are introduced to enhance the ambience and aesthetically appeal of the environment.

Among different decorations, there is one kind of lighting decoration that has a light assembly mounted inside a shaped body. The light assembly lights up the lighting decoration, via the shaped body, making the lighting decoration have a more decorative look than a normal decoration.

However, either when the light assembly is turned on or turned off, the visual appeal of the lighting decoration is decided by the shaped body. In other words, there is no big difference between the looks of the lighting decoration when lit up and when not lit up. Therefore, the lighting decoration lacks variations and surprise and still has insufficient decorative effect.

Another kind of the lighting decoration further has a film with patterns mounted inside the shaped body. The light assembly emits light to the film to project a projected figure on a surface of the shaped body. However, a contour of the projected figure is often blurry and unclear, and therefore the lighting decoration still has poor decorative effect needing to be improved.

SUMMARY OF THE INVENTION

The technical issue that a projecting decoration in accordance with the present invention resolves is that there is no big difference between looks of a conventional lighting decoration when turned on and when turned off, therefore lacking variations, surprise and decorative effect, or a contour of a projected figure on a lighting decoration is often blurry and unclear.

The projecting decoration of the present invention comprises an outer shell, a light assembly, a light-blocking cover, and a controller. The outer shell is hollow internally and allows light to pass through. The light assembly is mounted inside the outer shell and comprises a base board and multiple light units mounted at the base board and being controllable to emit light. The light-blocking cover is mounted inside the outer shell, is mounted at the base board, and comprises a light-blocking body and at least one separating wall. The light-blocking body is hollow, is connected to the base board of the light assembly, and has multiple hollowed-out graphic portions, which respectively correspond to the multiple light units. The at least one separating wall is mounted inside the light-blocking body and is disposed between each adjacent two of the multiple hollowed-out graphic portions. The controller is electrically connected to the light assembly and controls a part of the multiple light units to turn on while turning off another part of the multiple light units. The controller controls each one of the multiple light units to turn off or turn on, such that each one of the multiple light units emits light to a corresponding one of the multiple hollowed-out graphic portions. The light passes through said hollowed-out graphic portion to project to the outer shell, such that a projected FIG. corresponding to said hollowed-out graphic portion is shown on the outer shell.

The light assembly and the light-blocking cover are mounted inside the outer shell. The controller controls the multiple light units of the light assembly to emit light, so that the light passes through the multiple hollowed-out graphic portions of the light-blocking cover to project the projected figures on the outer shell and at the same time lights up the outer shell. The projecting decoration thereby generates a decorative effect. Especially, the multiple hollowed-out graphic portions show emote-glowing figures on the outer shell of the projecting decoration. In addition, because the multiple hollowed-out graphic portions are separated by the at least one separating wall, the lights projected to the corresponding hollowed-out graphic portion by two adjacent light units will reduce or avoid the interference with each other. Furthermore, a whole projected figure is divided into parts composed by multiple projected figures, which are respectively projected by the multiple hollowed-out graphic portions and the multiple light units. So, each one of the multiple projected figures has a smaller area with more concentrated light, thereby preventing a contour of the projected figure becoming blurry and unclear. And thus, the whole projected figure shown on the outer shell is clear.

Besides, when the controller controls the multiple light units to turn off, a look of the projecting decoration is only a shape of the outer shell. Alternatively, when the controller controls the multiple light units to turn on, the projected figures of the multiple hollowed-out graphic portions corresponding to the multiple light units will be shown on the outer shell. As a result, the visual appeals of the projecting decoration when turned on and when turned off are significantly different, thereby inciting a sense of surprise and fun and enhancing a decorative effect.

Moreover, the controller can control a part of the multiple light units to turn on while controlling another part to turn off, so that different projected figures of the multiple hollowed-out graphic portions corresponding to different light units are shown on the outer shell. With the multiple hollowed-out graphic portions having different graphics, various projected figures are shown on the outer shell. When the controller repeatedly controls the originally-turned-on light unit to turn off while controlling the originally-turned-off light unit to turn on, the outer shell will continuously show various projected figures, which is similar to animations, thereby inciting a sense of surprise and fun and enhancing the decorative effect.

BRIEF DESCRIPTION OF THE DRAWINGS

FIG. 19 is a front view of a third embodiment of the projecting decoration in accordance with the present invention, turned on;

DETAILED DESCRIPTION OF THE PREFERRED EMBODIMENT

With reference to drawings and preferable embodiments in accordance with the present invention, descriptions below are to elaborate technical means to achieve intended purpose of the present invention.

With reference to FIGS. 1, 2, 13, and 20, multiple embodiments of a projecting decoration in accordance with the present invention are shown. The projecting decoration comprises an outer shell 10*a*, 10*b*, 10*c*, a light assembly 20, a light-blocking cover 30, and a controller 40.

Figure 1:
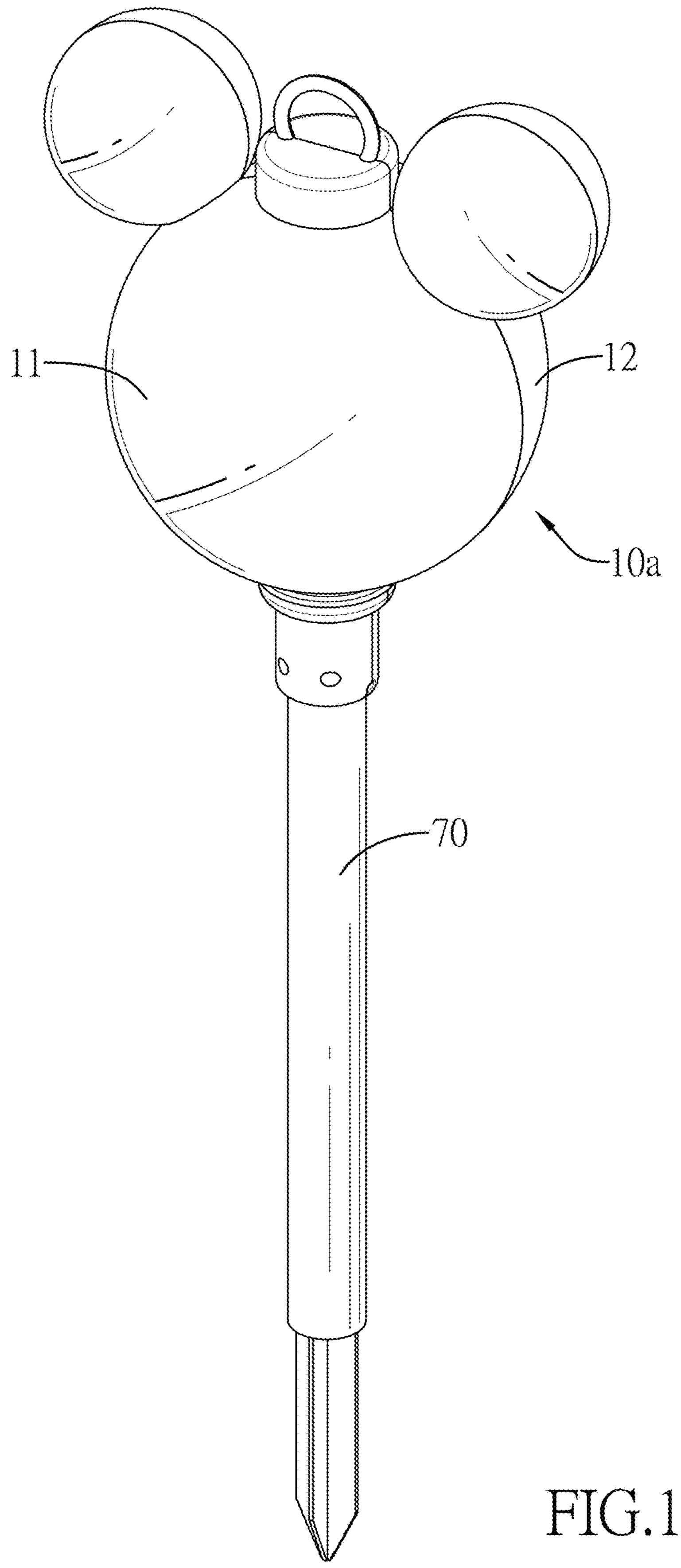
FIG. 1 is a perspective view of a first embodiment of a projecting decoration in accordance with the present invention.
Figure 2:
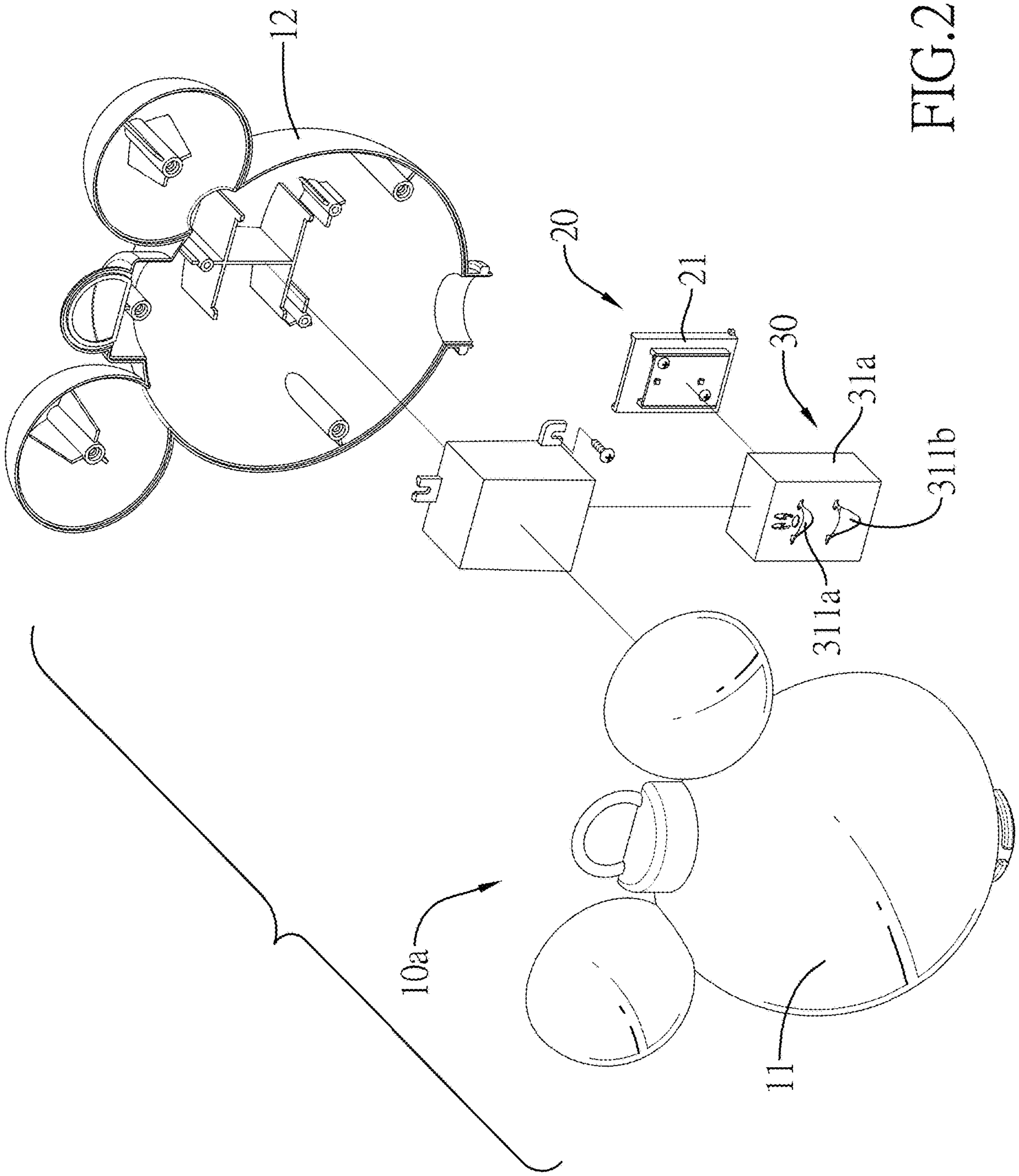
FIG. 2 is an exploded perspective view of the first embodiment of the projecting decoration in FIG. 1.
Figure 13:
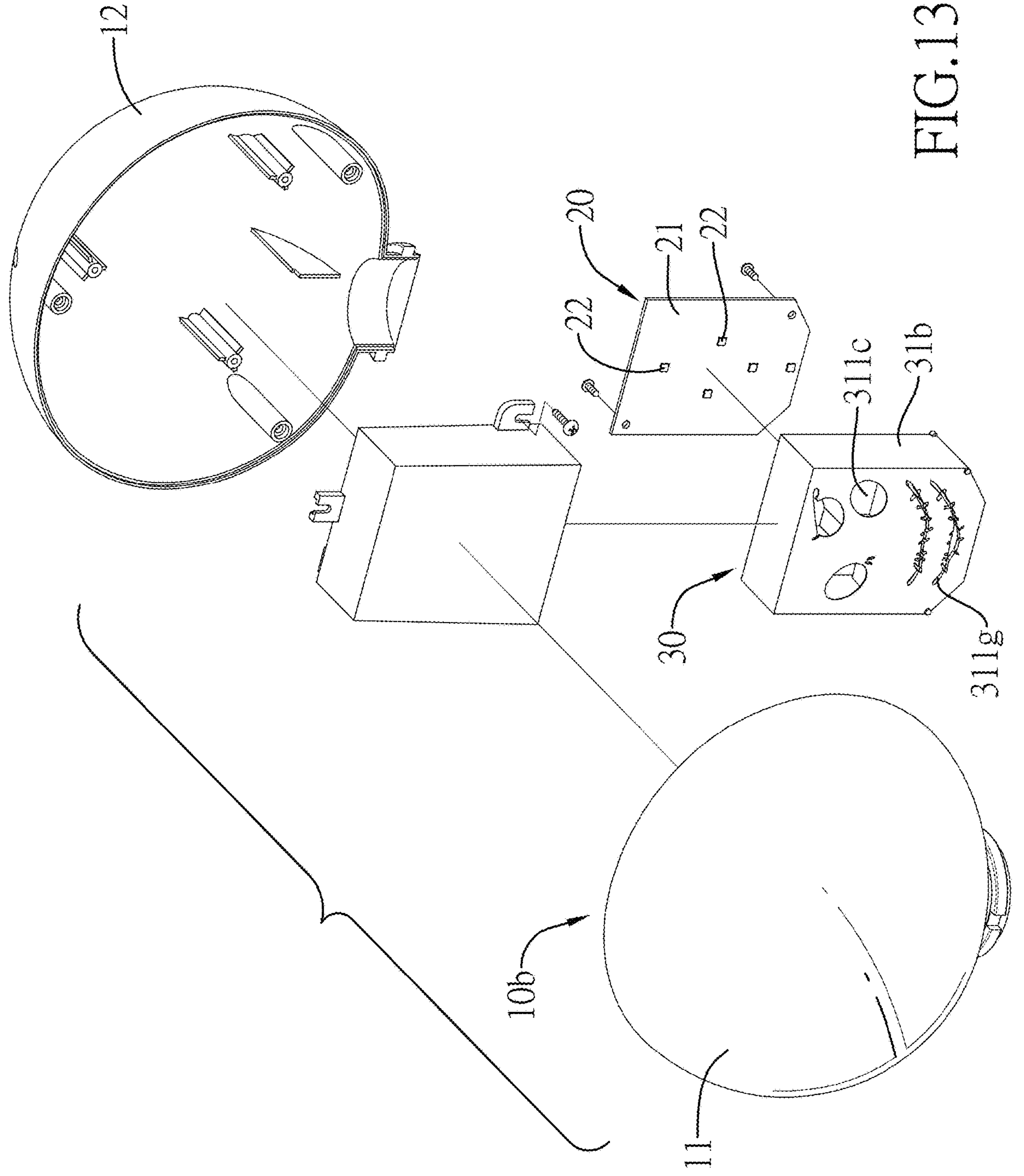
FIG. 13 is an exploded perspective view of a second embodiment of the projecting decoration in accordance with the present invention.
Figure 14:
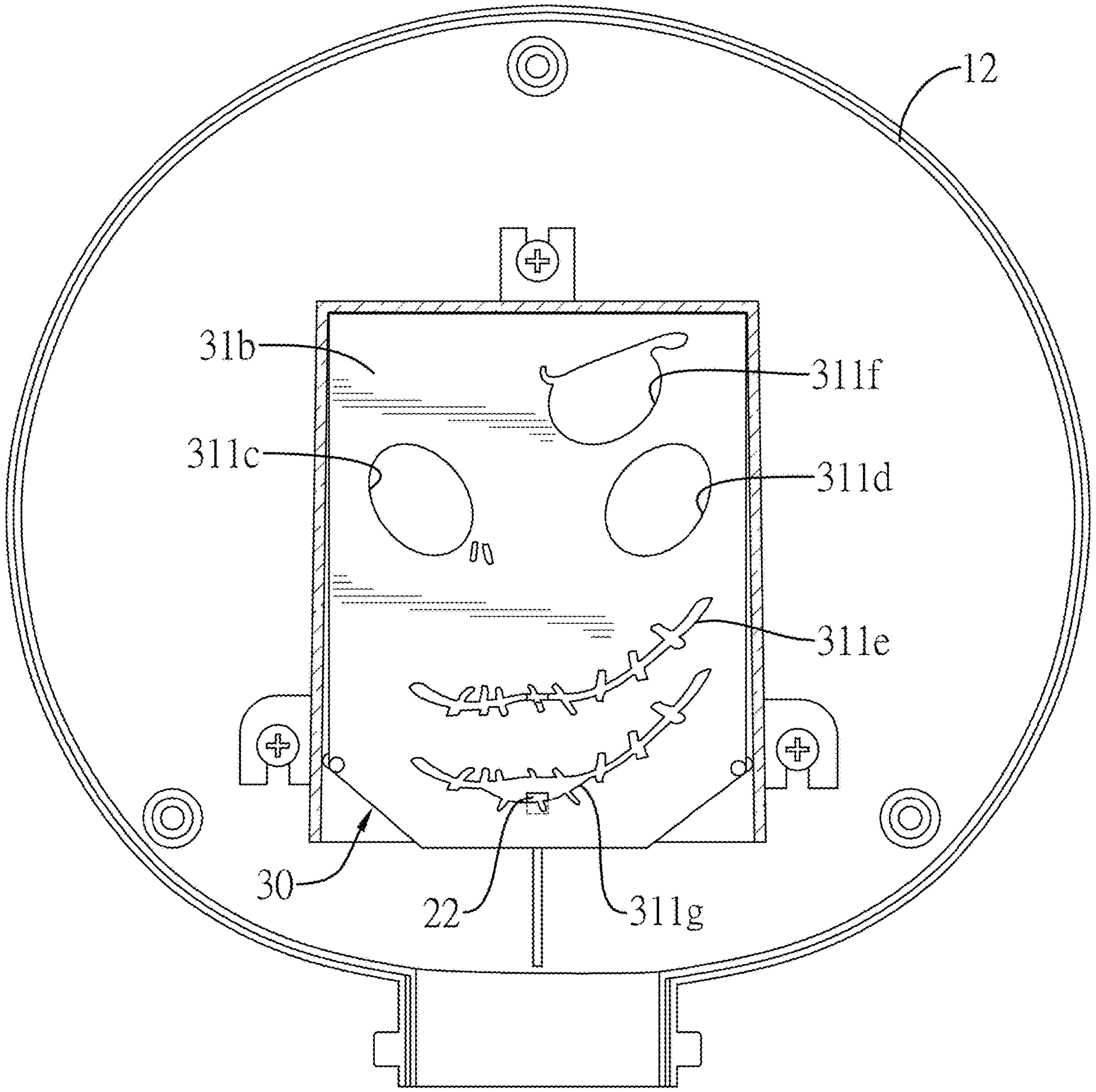
FIG. 14 is a front view of the interior of the outer shell of the second embodiment of the projecting decoration in FIG. 13.
Figure 20:
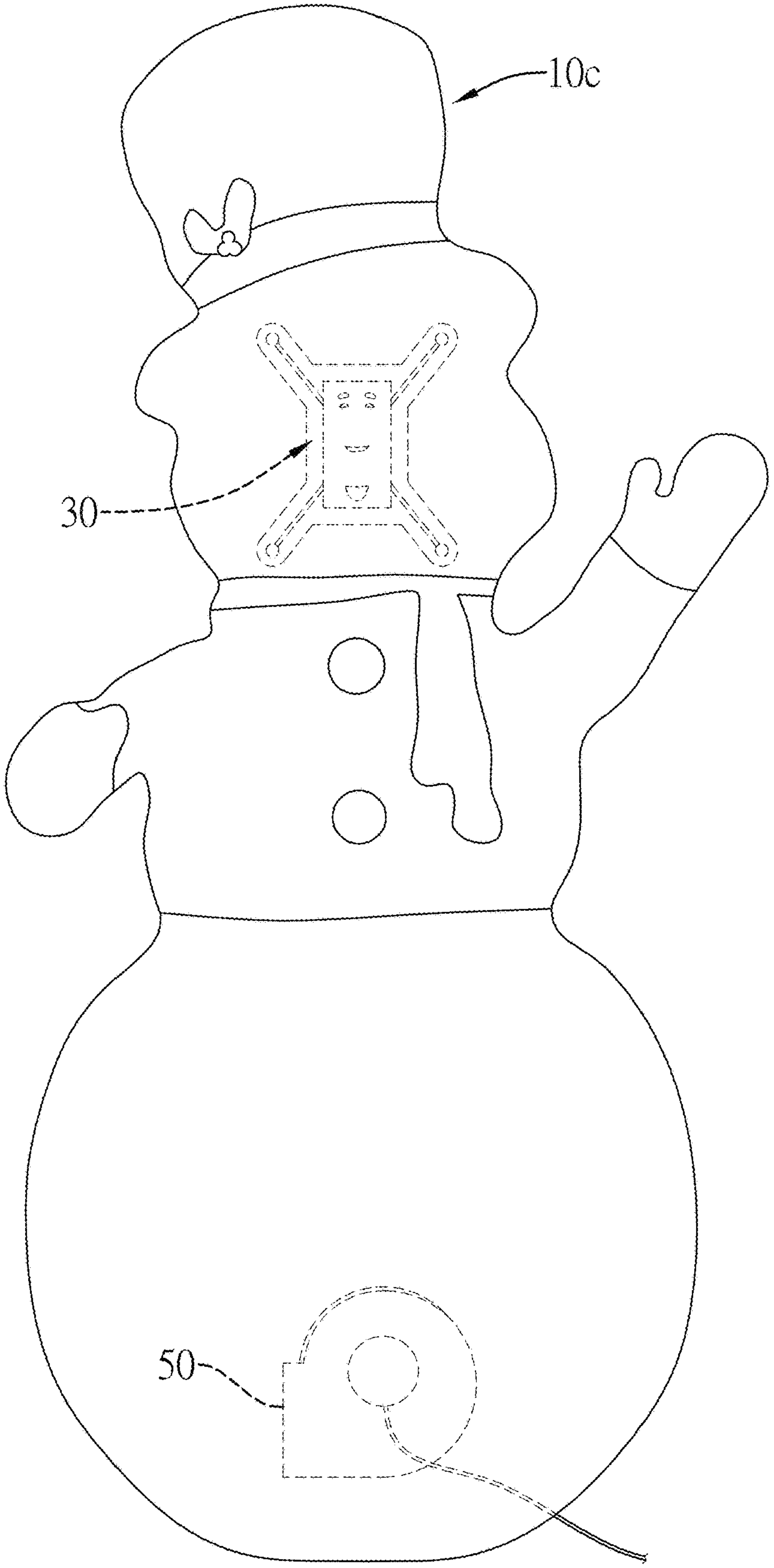
FIG. 20 is a front view of the third embodiment of the projecting decoration in FIG. 19, turned off.
Figure 21:
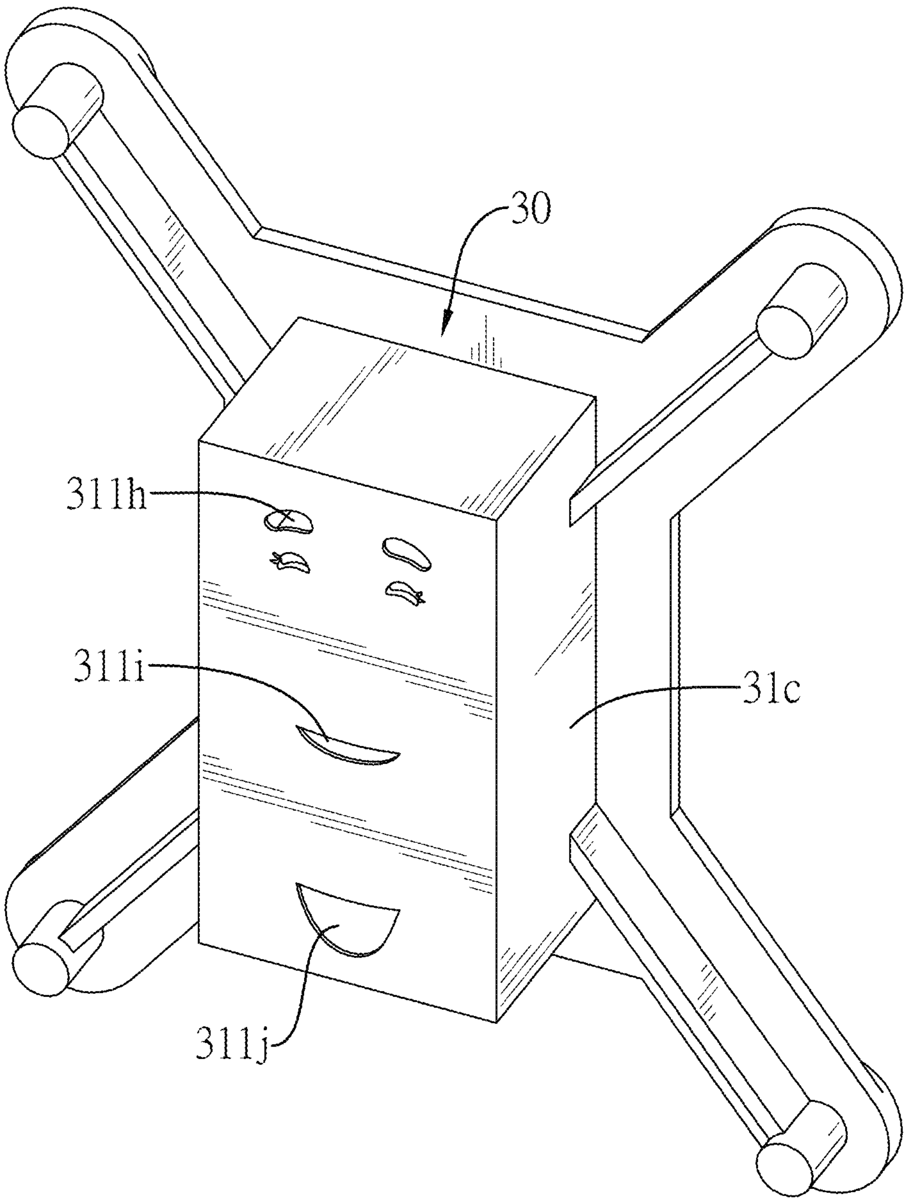
FIG. 21 is a perspective view of the light assembly and the light-blocking cover of the third embodiment of the projecting decoration in FIG. 19.

With reference to FIGS. 2, 13, and 20, the outer shell 10*a*, 10*b*, 10*c* is hollow internally, allowing light to pass through.

With reference to FIGS. 2, 3, 13, and 20, the light assembly 20 is mounted inside the outer shell 10*a*, 10*b*, 10*c* and comprises a base board 21 and multiple light units 22. The multiple light units 22 are mounted at the base board 21 and are controllable to emit light.

With reference to FIGS. 2 to 5, 13 to 15, 21, and 22, the light-blocking cover 30 is mounted inside the outer shell 10*a*, 10*b*, 10*c*, is mounted at the base board 21 and comprises a light-blocking body 31*a*, 31*b*, 31*c* and at least one separating wall 32. The light-blocking body 31*a*, 31*b*, 31*c* is hollow and has multiple hollowed-out graphic portions 311*a* to 311*j*. The at least one separating wall 32 is mounted inside the light-blocking body 31*a*, 31*b*, 31*c* and is disposed between each adjacent two of the multiple hollowed-out graphic portions 311*a* to 311*j*. The base board 21 of the light assembly 20 and the light-blocking body 31*a*, 31*b*, 31*c* connect together. The multiple light units 22 respectively correspond to the multiple hollowed-out graphic portions 311*a* to 311*j*. Each one of the multiple hollowed-out graphic portions 311*a* to 311*j* is at least one hole, which has a preset graphical contour and is formed on the light-blocking body 31*a*, 31*b*, 31*c*.

Figure 11:
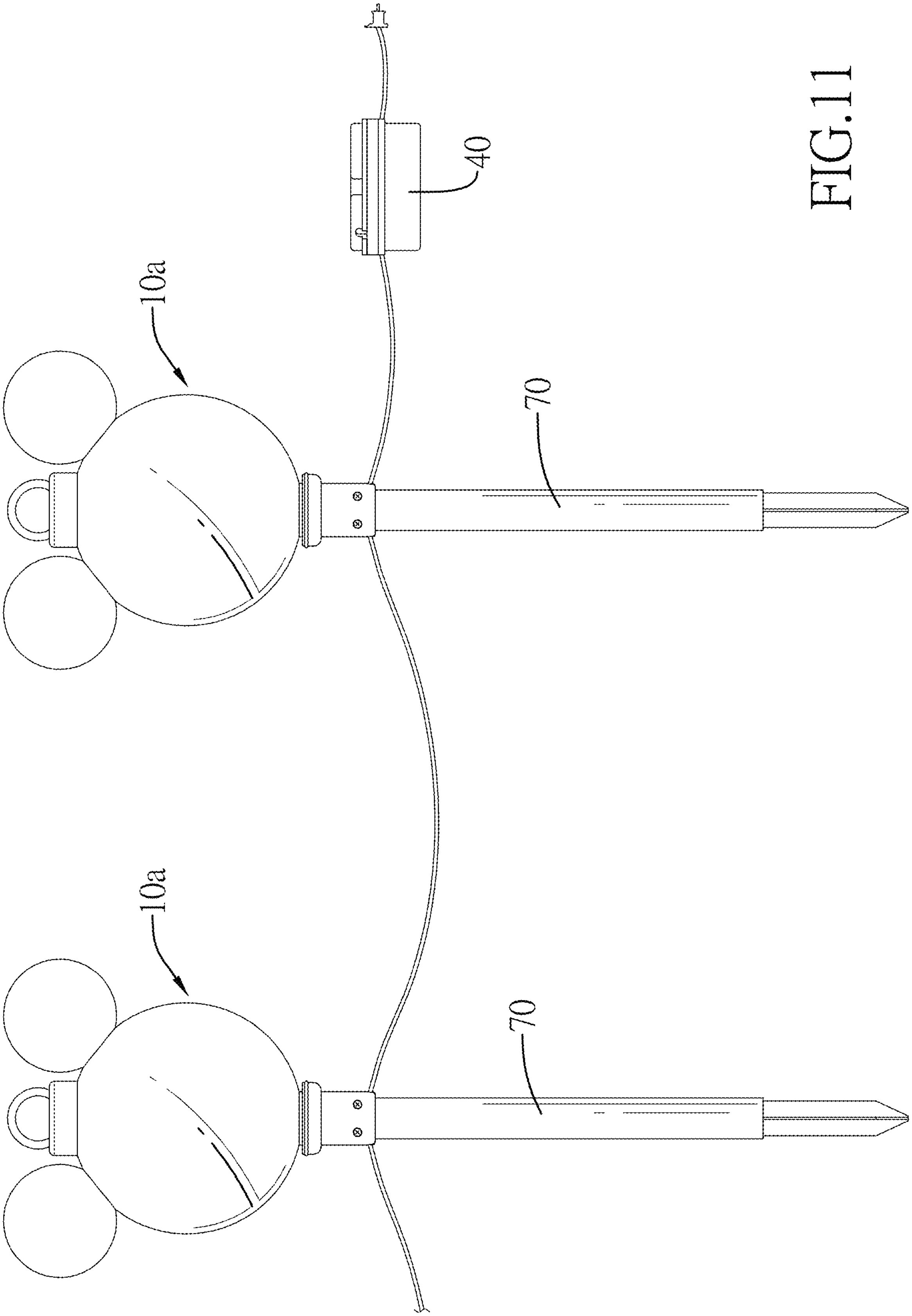
FIG. 11 is a front view of multiple said projecting decorations of the first embodiment in FIG. 1, connected together and each having a ground rod.
Figure 12:
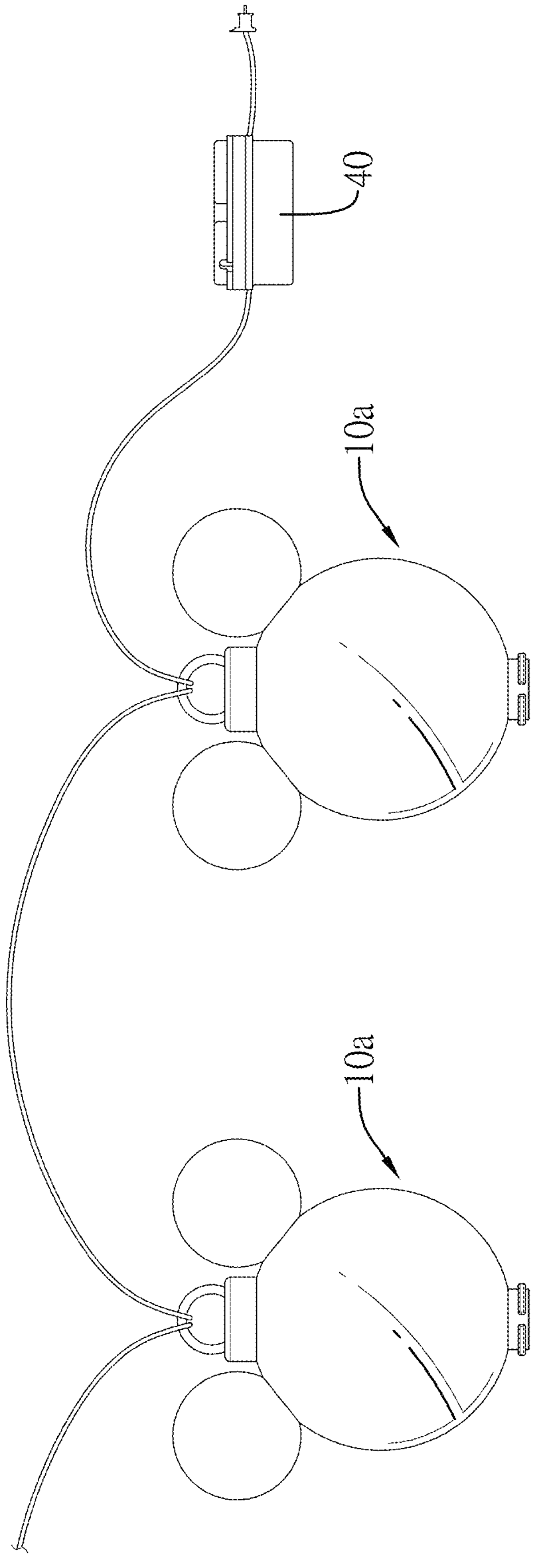
FIG. 12 is a front view of multiple said projecting decorations of the first embodiment in FIG. 1, connected together and hung up.

With reference to FIGS. 11 and 12, the controller 40 is electrically connected to the light assembly 20 and can control each one of the multiple light units 22 to turn on and turn off. Each one of the multiple light units 22 emits light to a corresponding one of the hollowed-out graphic portions 311*a* to 311*j*, so that the light passes through said hollowed-out graphic portion 311*a* to 311*j* to be projected to the outer shell 10*a*, 10*b*, 10*c*. A projected FIGS. 60*a* to 60*i* corresponding to said hollowed-out graphic portion 311*a* to 311*j* is hence shown on the outer shell 10*a*, 10*b*, 10*c*. Besides, the controller 40 can control a part of the multiple light units 22 to turn on while turning off another part of the multiple light units 22.

With reference to FIGS. 7 to 9, 11, 12, and 16 to 19, the light assembly 20 and the light-blocking cover 30 are mounted inside the outer shell 10*a*, 10*b*, 10*c*. The controller 40 controls the multiple light units 22 of the light assembly 20 to emit light. The light passes through the multiple hollowed-out graphic portions 311*a* to 311*j* of the light-blocking cover 30 to project the projected FIGS. 60*a* to 60*i* on the outer shell 10*a*, 10*b*, 10*c* and at the same time lights up the outer shell 10*a*, 10*b*, 10*c*. The projecting decoration thereby generates a decorative effect. Especially, the multiple hollowed-out graphic portions 311*a* to 311*j* show emote-glowing figures on the outer shell 10*a*, 10*b*, 10*c* of the projecting decoration.

Besides, as shown in FIG. 11, the outer shell 10*a*, 10*b* can be mounted on a ground rod 70 to be set up on the ground. Alternatively, as shown in FIG. 12, multiple said projecting decorations can be connected together through wires to be hung up under eaves or on a fence. Furthermore, multiple said projecting decorations can be connected together while controlled by the same controller 40 to turn on or off simultaneously, enhancing an atmosphere and lowering down a cost of the controller 40.

Figure 3:
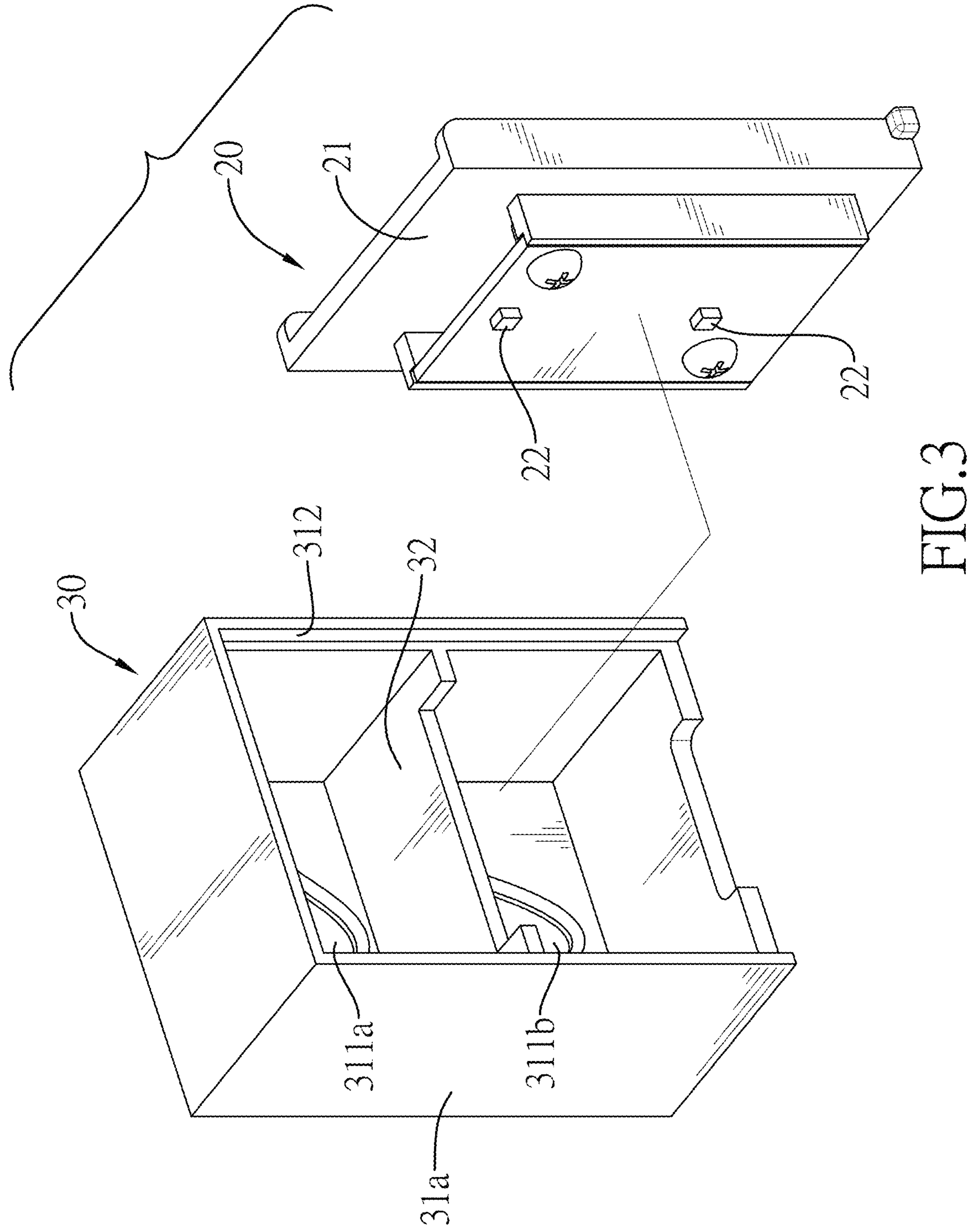
FIG. 3 is an exploded perspective view of a light assembly and a light-blocking cover of the first embodiment of the projecting decoration in FIG. 1.
Figure 4:
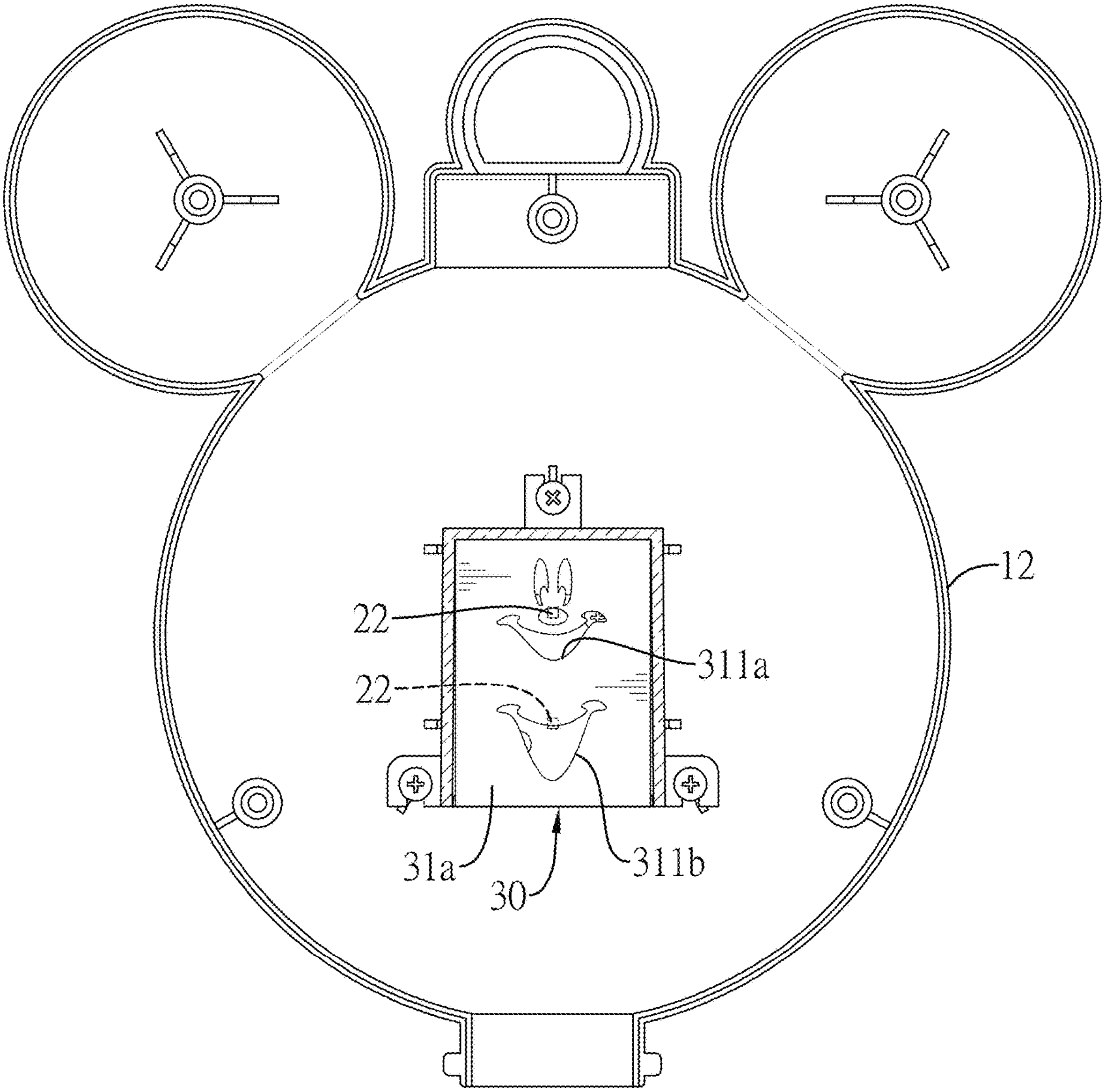
FIG. 4 is a front view of an interior of an outer shell of the first embodiment of the projecting decoration in FIG. 1.
Figure 5:
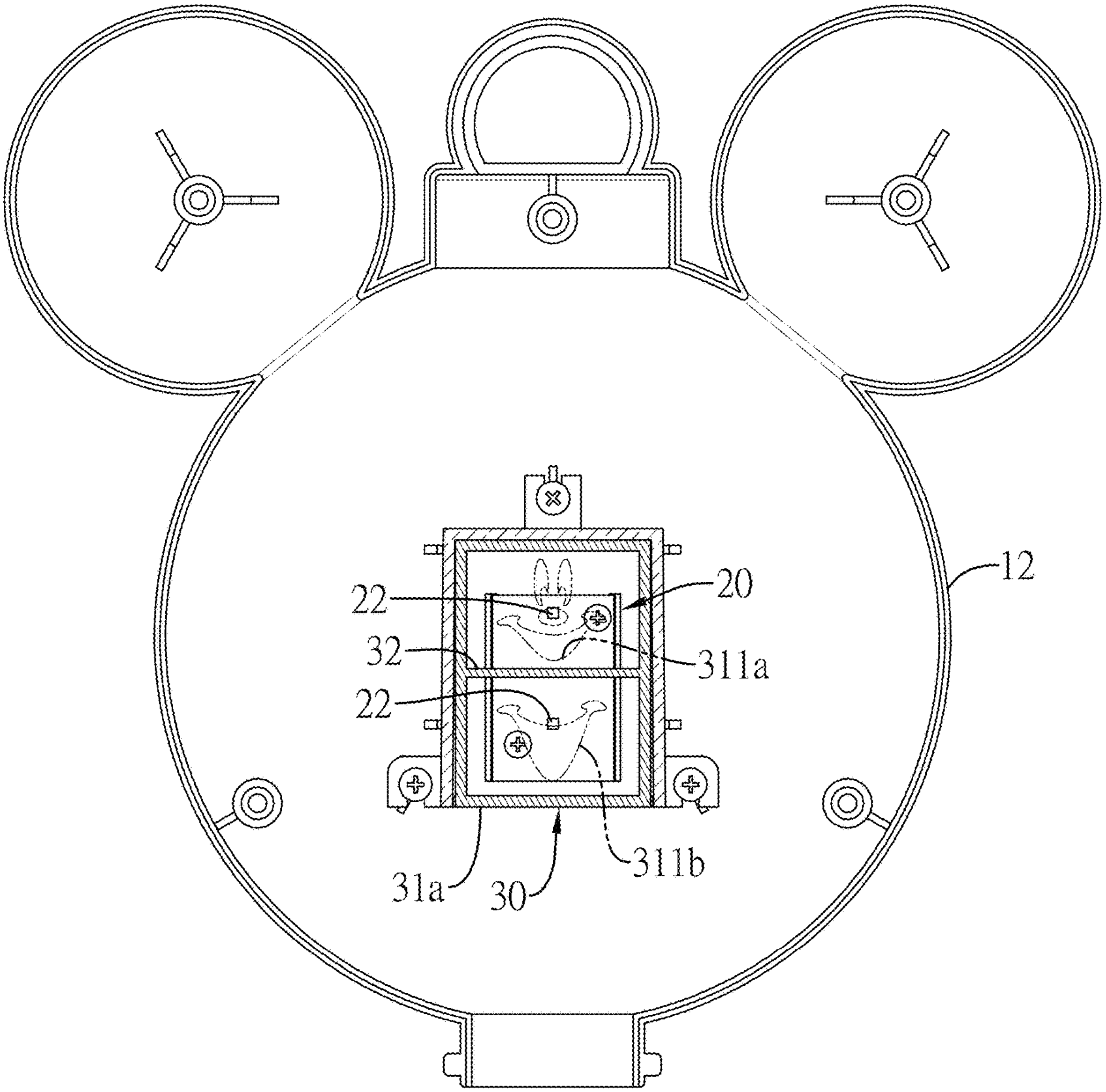
FIG. 5 is a front sectional view of the light-blocking cover of the first embodiment of the projecting decoration in FIG. 1.
Figure 6:
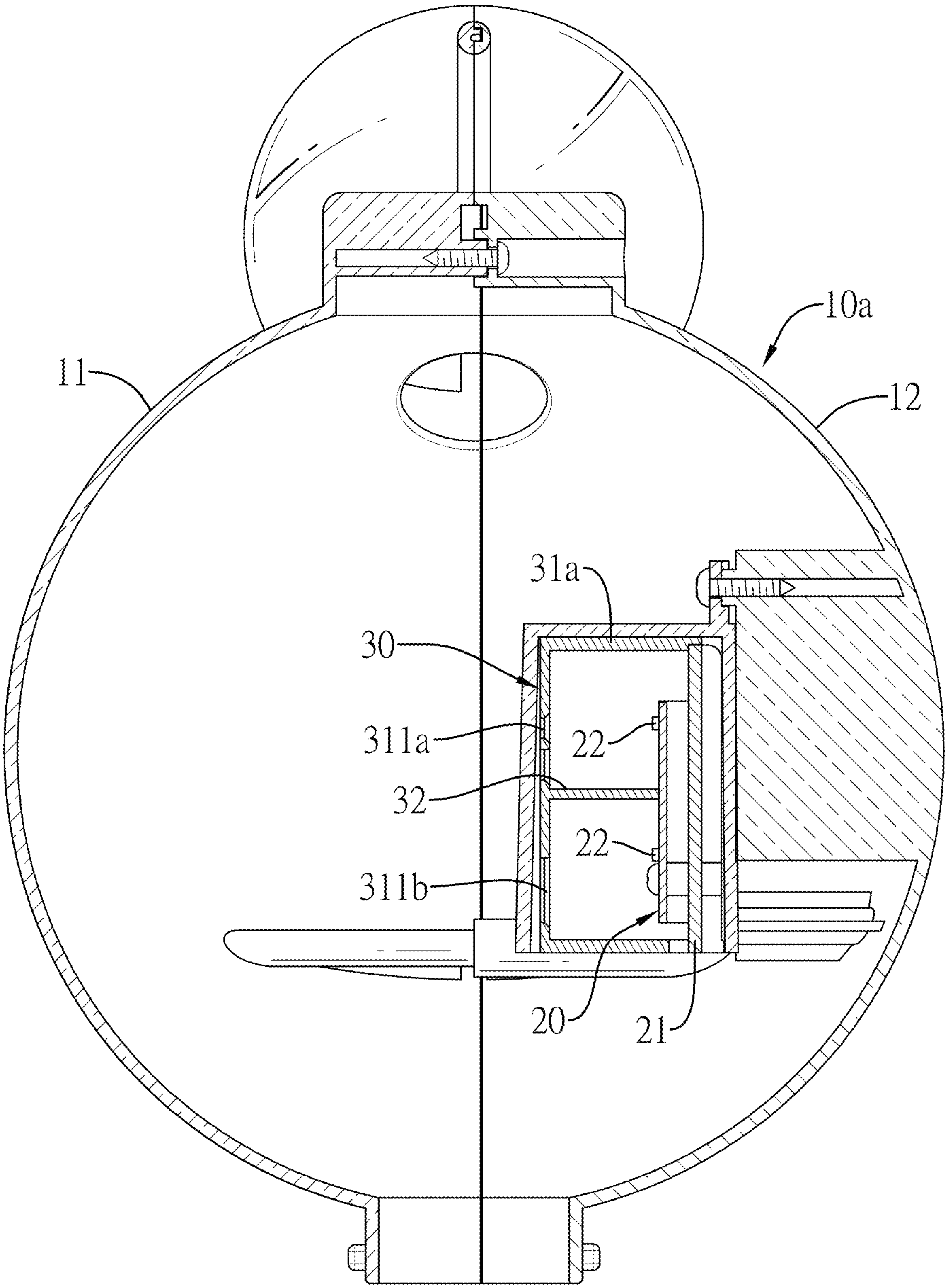
FIG. 6 is a side sectional view of the first embodiment of the projecting decoration in FIG. 1.
Figure 22:
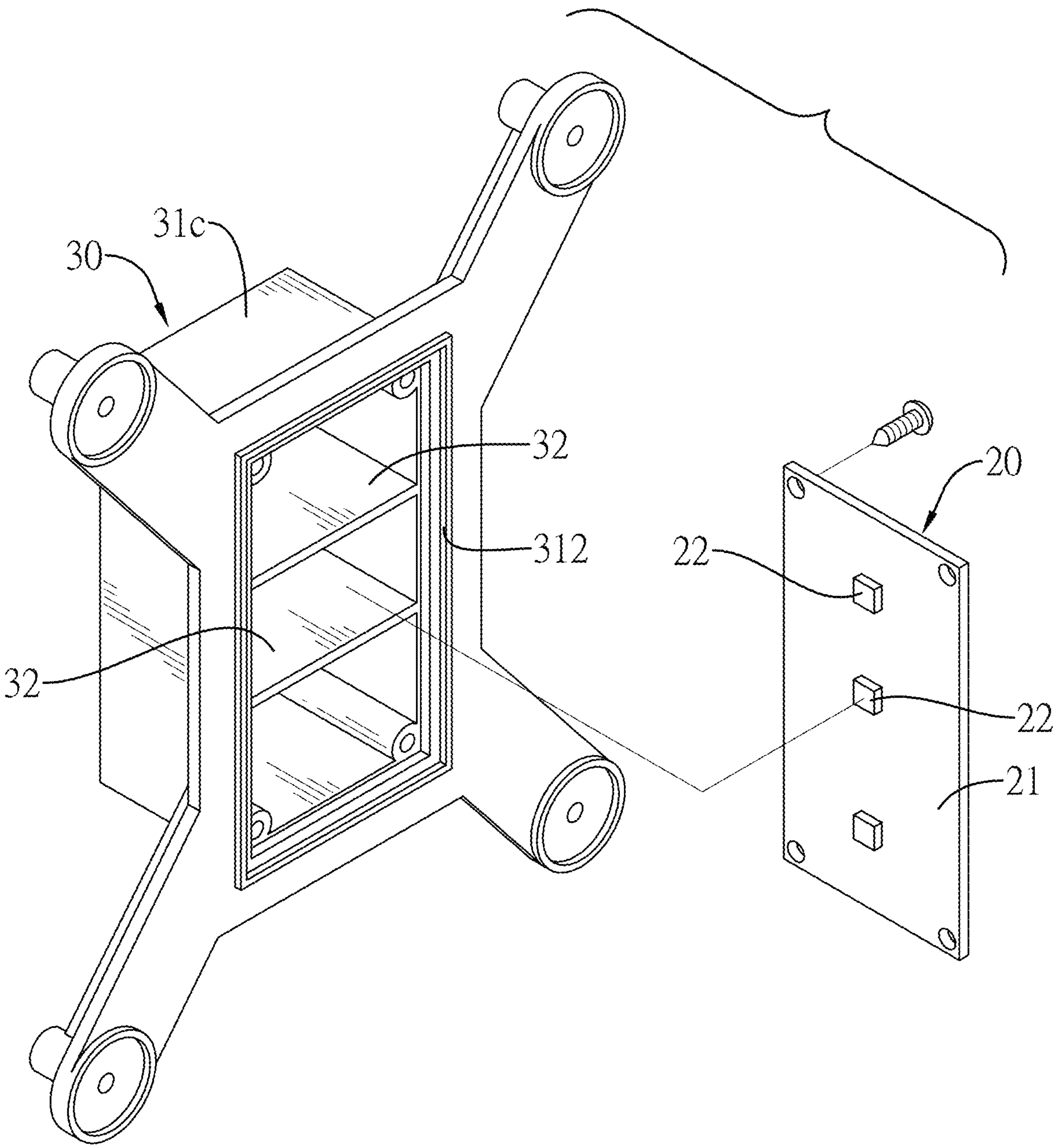
FIG. 22 is an exploded perspective view of the light assembly and the light-blocking cover of the third embodiment of the projecting decoration in FIG. 19.

Moreover, as shown in FIG. 6, because the multiple hollowed-out graphic portions 311*a* to 311*j* are separated by the at least one separating wall 32, the light emitted to one of the multiple hollowed-out graphic portions 311*a* to 311*j* by the corresponding light unit 22 will reduce or avoid the interference with the light emitted by another light unit 22. As the light emitted by the multiple light units 22 does not interfere with each other, the outer shell 10*a*, 10*b*, 10*c* will show clear projected FIGS. 60*a* to 60*i*. Preferably, as shown in FIGS. 3 and 22, the light-blocking body 31*a*, 31*b*, 31*c* has an assembling opening 312. The base board 21 of the light assembly 20 is mounted at the assembling opening 312 of the light-blocking body 31*a*, 31*b*, 31*c*. The multiple light units 22 extend into the light-blocking body 31*a*, 31*b*, 31*c*. Each adjacent two of the multiple light units 22 are separated by one of the at least one separating wall 32 to separate the lights emitted by the multiple light units 22, thereby making the projected FIGS. 60*a* to 60*i* clearer. In addition, a whole projected figure is divided into parts, composed by multiple projected FIGS. 60*a* to 60*i*, which are respectively projected by the multiple hollowed-out graphic portions 311*a* to 311*j* and the multiple light units 22. So, each one of the multiple projected FIGS. 60*a* to 60*i* has a smaller area with more concentrated light, thereby preventing a contour of the projected FIGS. 60*a* to 60*i* becoming blurry and unclear, and thus the whole projected figure shown is clear.

Figure 7:
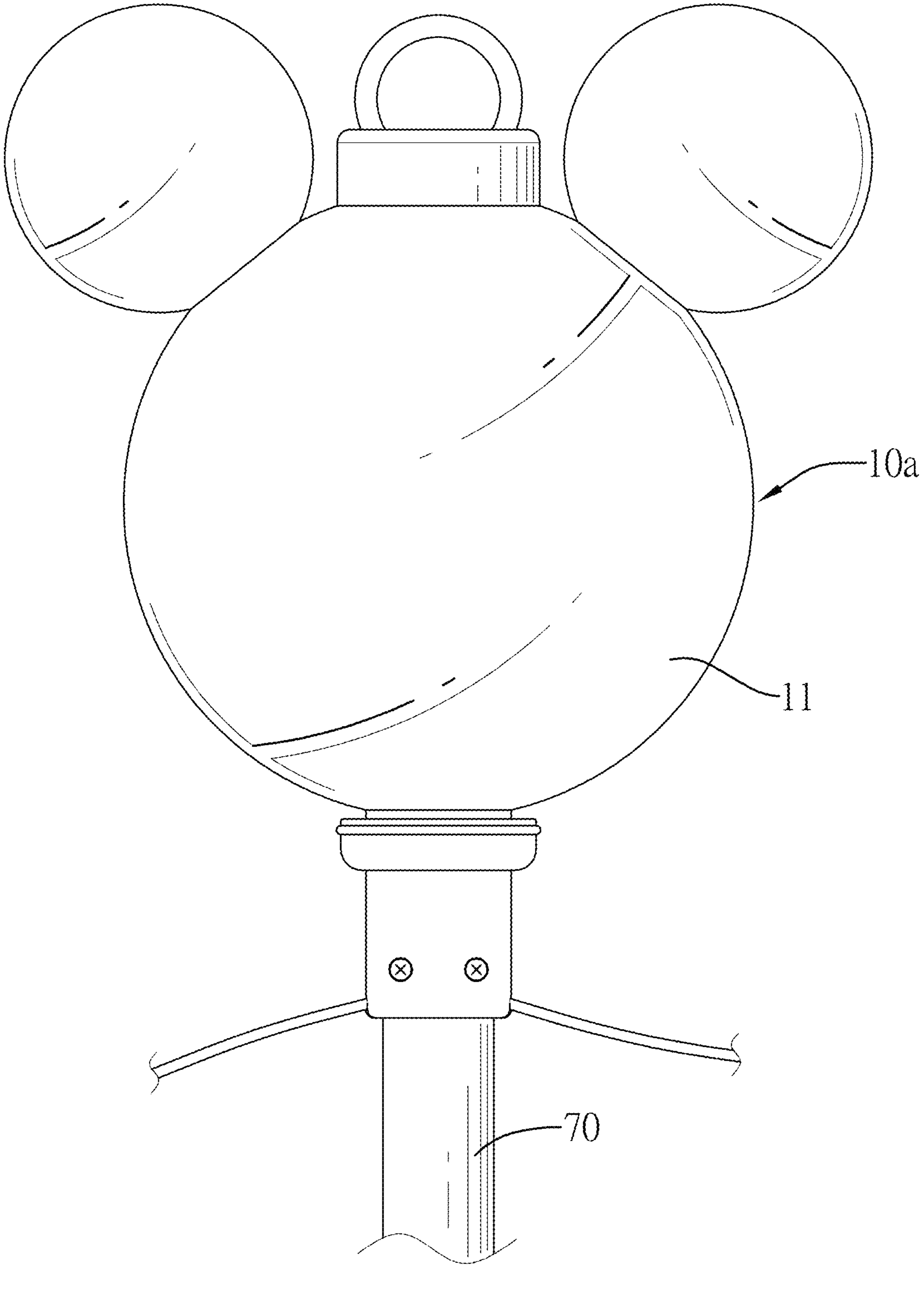
FIG. 7 is a front view of the first embodiment of the projecting decoration in FIG. 1, turned off.
Figure 16:
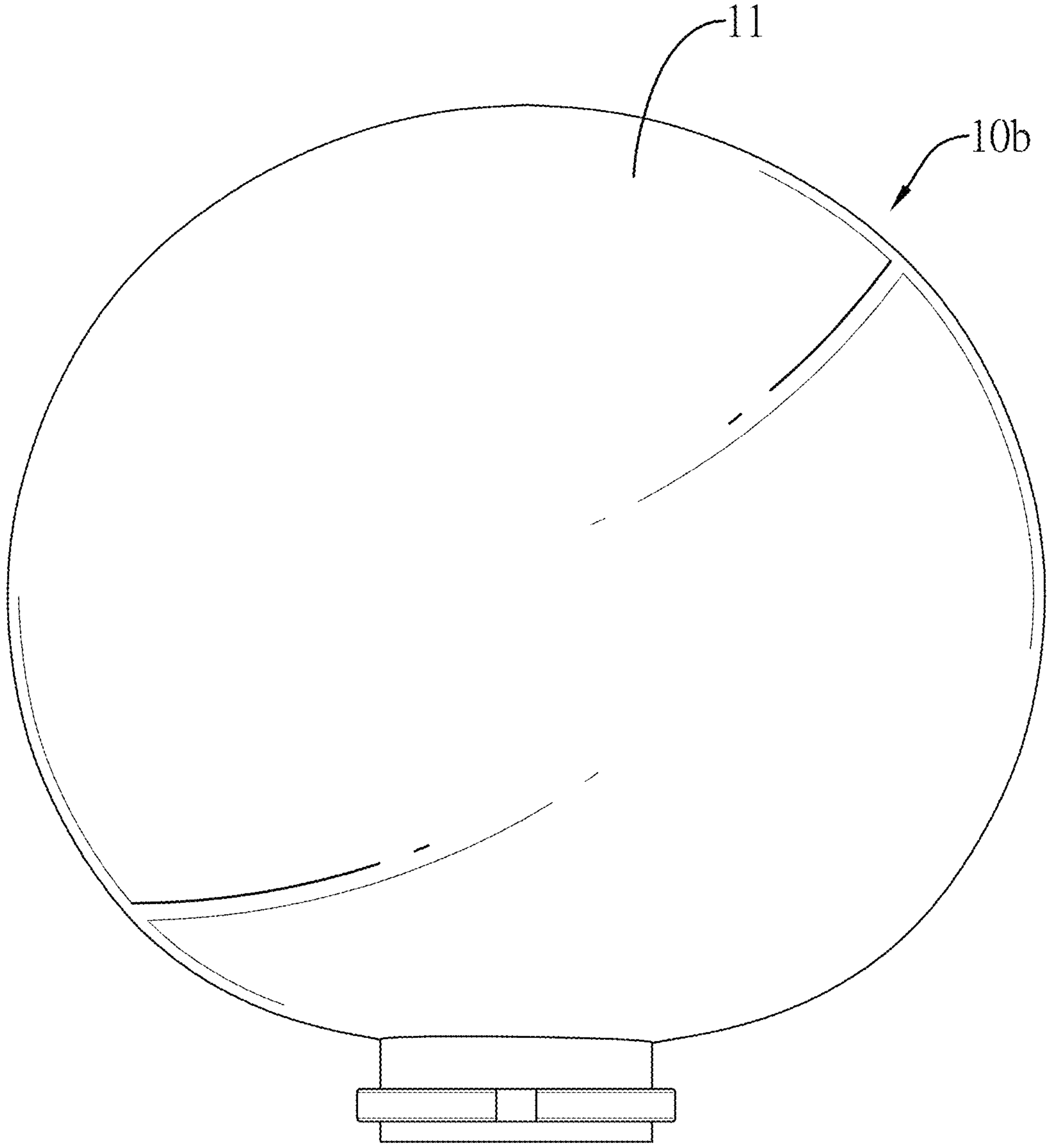
FIG. 16 is a front view of the second embodiment of the projecting decoration in FIG. 13, turned off.

Additionally, as shown in FIGS. 7, 16, and 20, when the controller 40 controls the multiple light units 22 to turn off, a look of the projecting decoration is merely a shape of the outer shell 10*a*, 10*b*, 10*c*. Alternatively, as shown in FIGS. 8, 9, and 17 to 19, when the controller 40 controls the multiple light units 22 to turn on, the projected FIGS. 60*a* to 60*i* of the hollowed-out graphic portions 311*a* to 311*j* corresponding to the multiple light units 22 will be shown on the outer shell 10*a*, 10*b*, 10*c*. As a result, the looks of the projecting decoration when turned on and when turned off are significantly different, thereby inciting a sense of surprise and fun and enhancing a decorative effect.

Preferably, the controller 40 has a sound module which produces sounds when the multiple light units 22 are turned on or turned off. The controller 40 simultaneously controls the multiple light units 22 of the light assembly 20 to turn on or turn off and controls the sound module to produce sounds, further enhancing ambience and inciting the sense of fun.

Besides, as shown in FIGS. 8, 9, and 17 to 19, the controller 40 turns on a part of the multiple light units 22 while turning off another part of the multiple light units 22, so that various projected FIGS. 60*a* to 60*i* of the multiple hollowed-out graphic portions 311*a* to 311*j* corresponding to different light units 22 are shown on the outer shell 10*a*, 10*b*, 10*c*. Since the multiple hollowed-out graphic portions 311*a* to 311*j* have different graphics, various projected FIGS. 60*a* to 60*i* are shown on the outer shell 10*a*, 10*b*, 10*c*. When the controller 40 repeatedly turns off the originally-turned-on light units 22 while turning on the originally-turned-off light units 22, the outer shell 10*a*, 10*b*, 10*c* will continuously show various projected FIGS. 60*a* to 60*i*, similar to animations, thereby inciting the sense of surprise and fun and enhancing the decorative effect.

Figure 8:
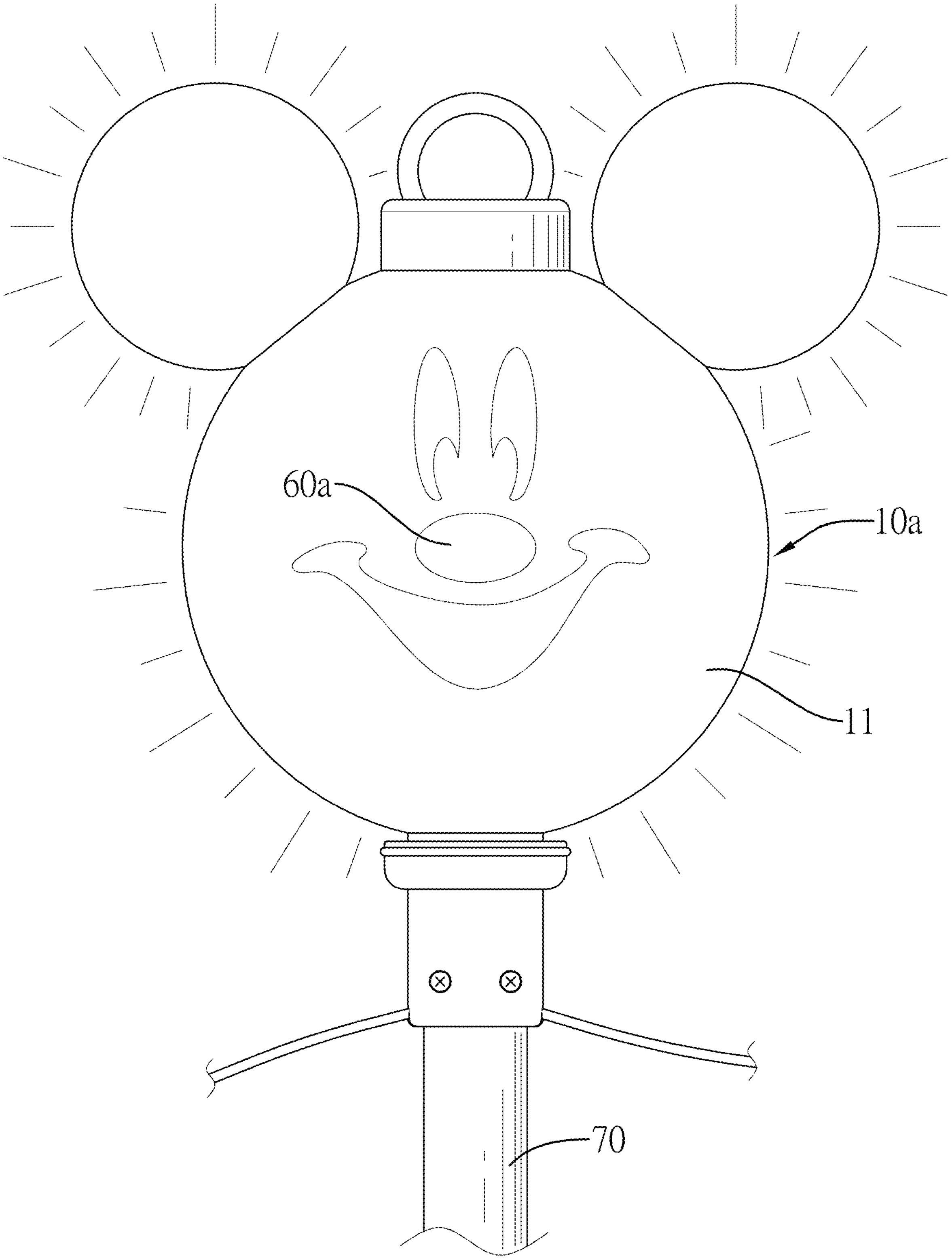
FIG. 8 is a front view of the first embodiment of the projecting decoration in FIG. 1, turned on and showing a lighting configuration.
Figure 9:
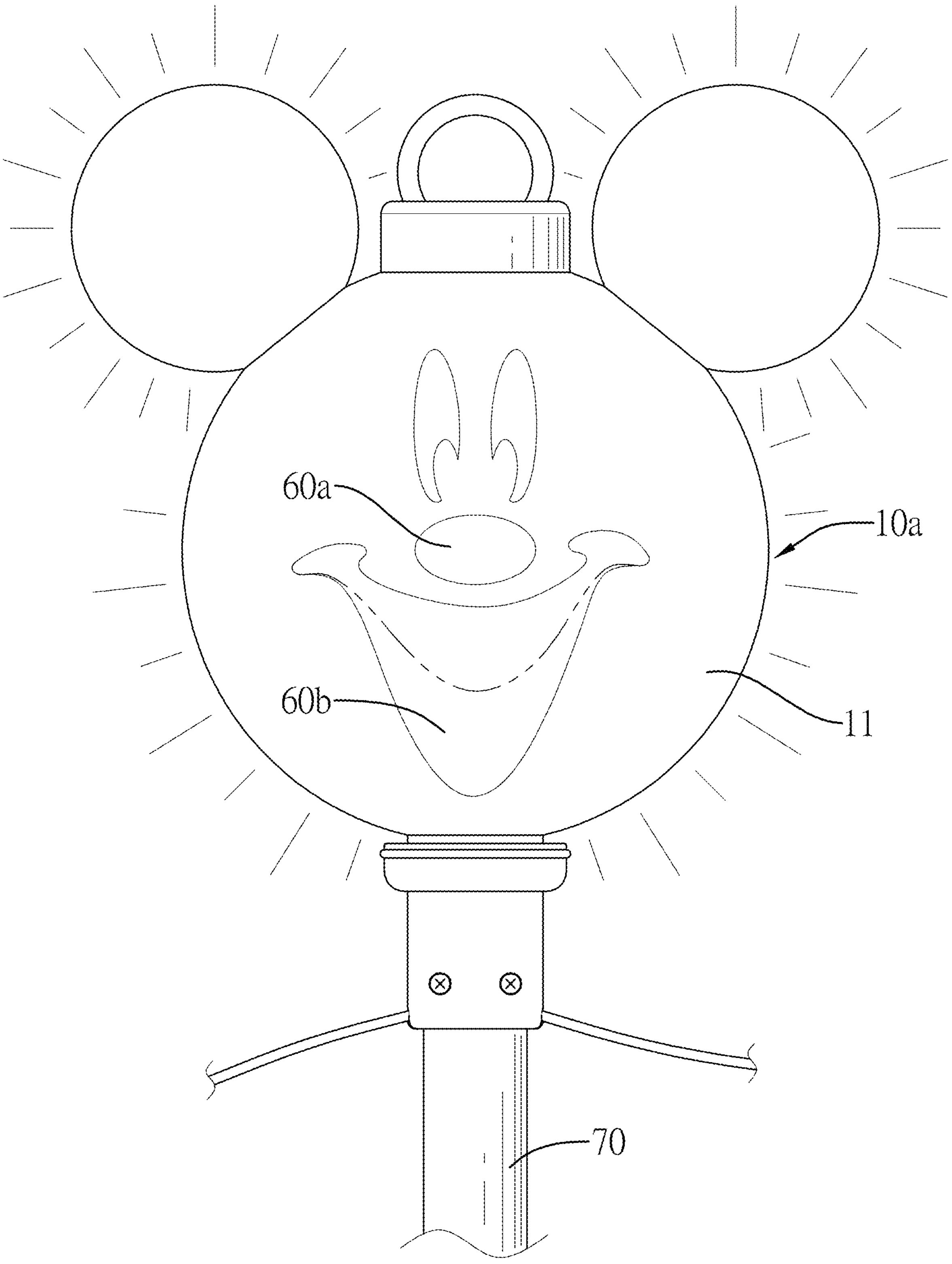
FIG. 9 is a front view of the first embodiment of the projecting decoration in FIG. 1, turned on and showing another lighting configuration.

Additionally, the controller 40 is preset to turn on a part of the multiple light units 22 and to turn off another part of the multiple light units 22. For example, in a lighting configuration of a first embodiment in accordance with the present invention, as shown in FIG. 8, the controller 40 first controls the light unit 22 corresponding to the hollowed-out graphic portion 311*a* to turn on and controls the light unit 22 corresponding to the hollowed-out graphic portion 311*b* to turn off, so the projected FIG. 60*a* corresponding to the hollowed-out graphic portion 311*a* is shown on the outer shell 10*a*. Alternatively, in another lighting configuration of the first embodiment, as shown in FIG. 9, the controller 40 controls two of the multiple light units 22 corresponding to the hollowed-out graphic portions 311*a*, 311*b* to turn on. That is, two of the multiple light units 22 emit light to two corresponding hollowed-out graphic portions 311*a*, 311*b*. When the light passes through the two hollowed-out graphic portions 311*a*, 311*b* to be projected to the outer shell 10*a*, the two projected FIGS. 60*a*, 60*b* shown on the outer shell 10*a* overlap with each other. Therefore, the outer shell 10*a* shows the two projected FIGS. 60*a*, 60*b* corresponding to the two hollowed-out graphic portions 311*a*, 311*b* simultaneously.

Figure 15:
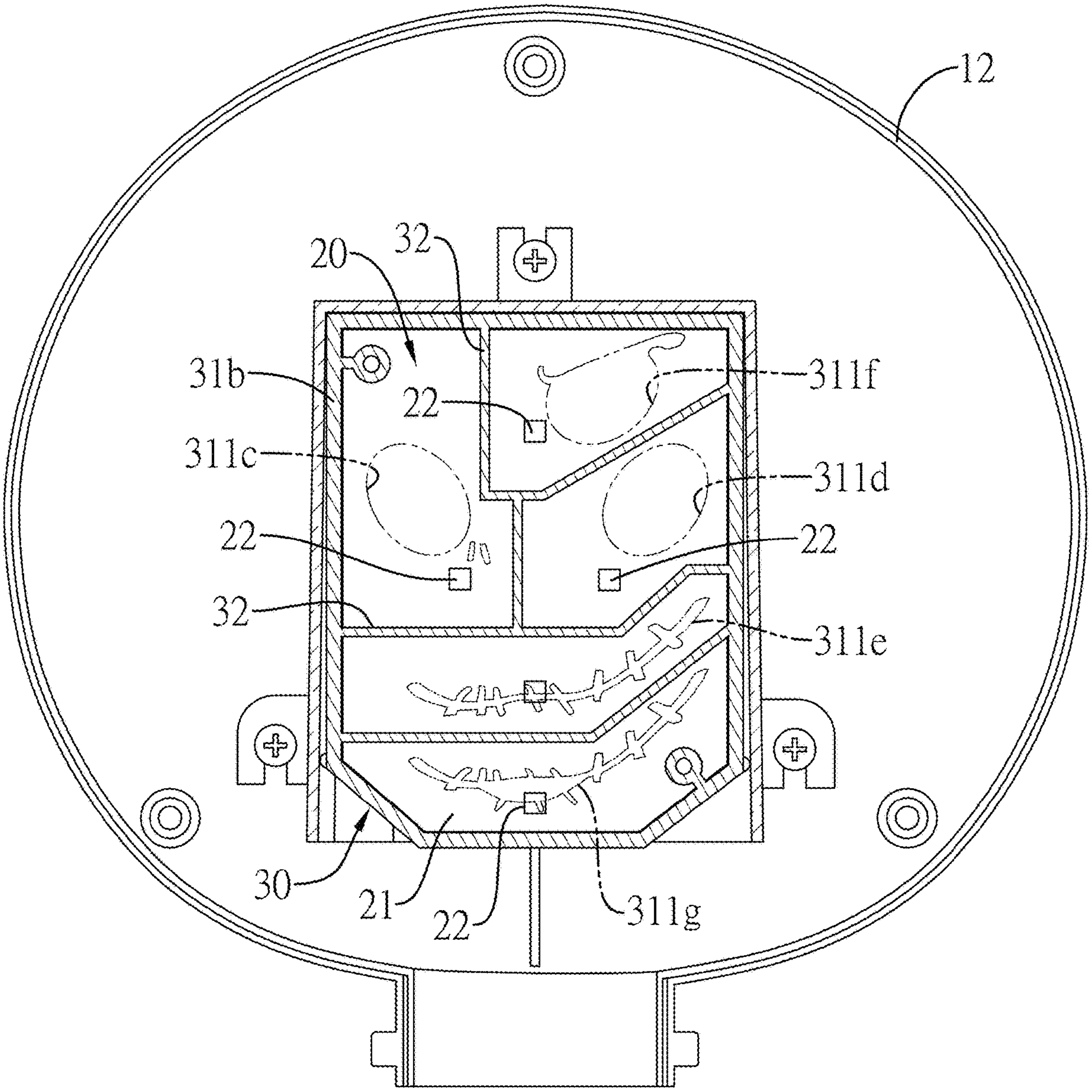
FIG. 15 is a front sectional view of the light-blocking cover of the second embodiment of the projecting decoration in FIG. 13.
Figure 17:
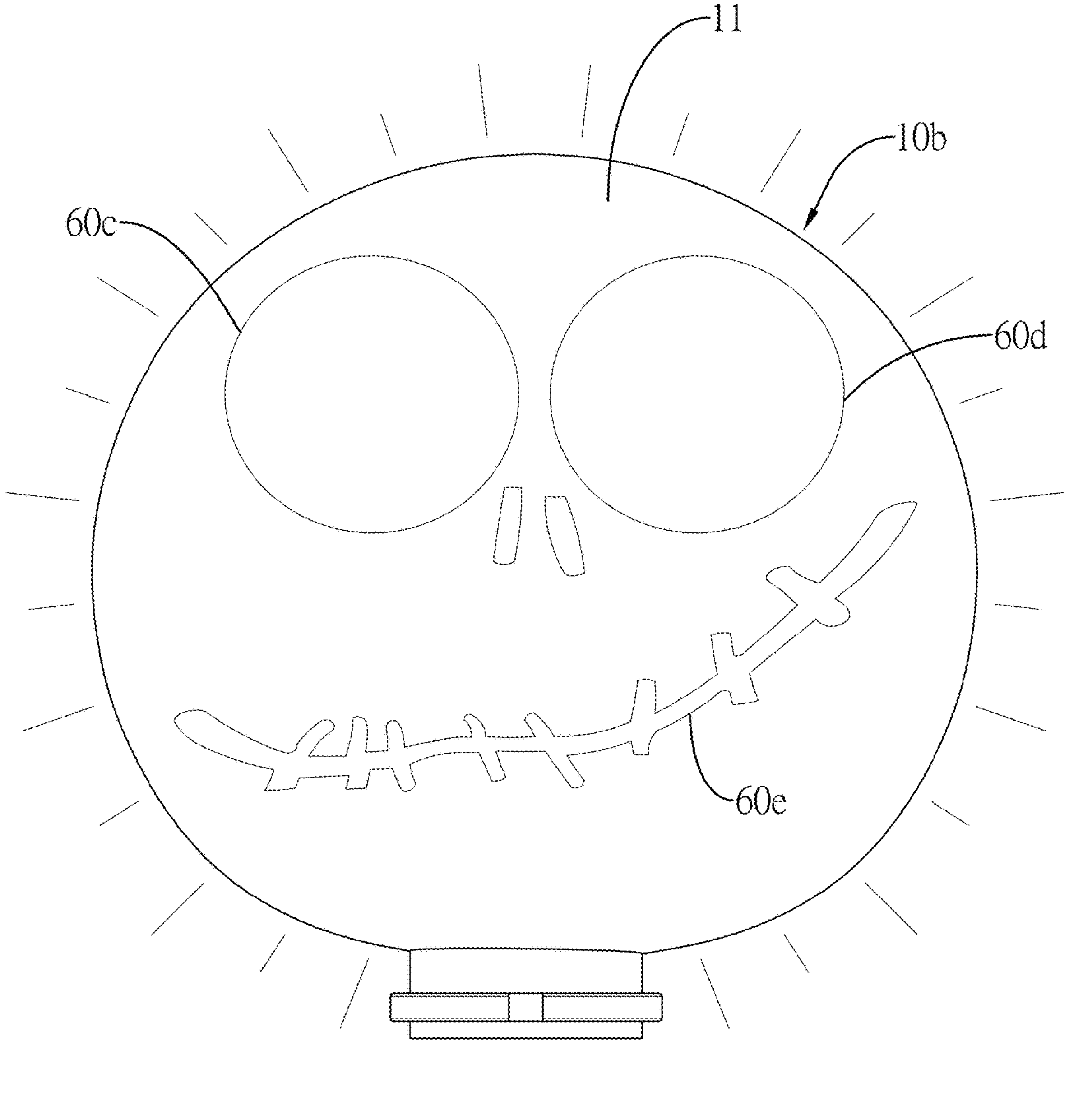
FIG. 17 is a front view of the second embodiment of the projecting decoration in FIG. 13, turned on and showing a lighting configuration.
Figure 18:
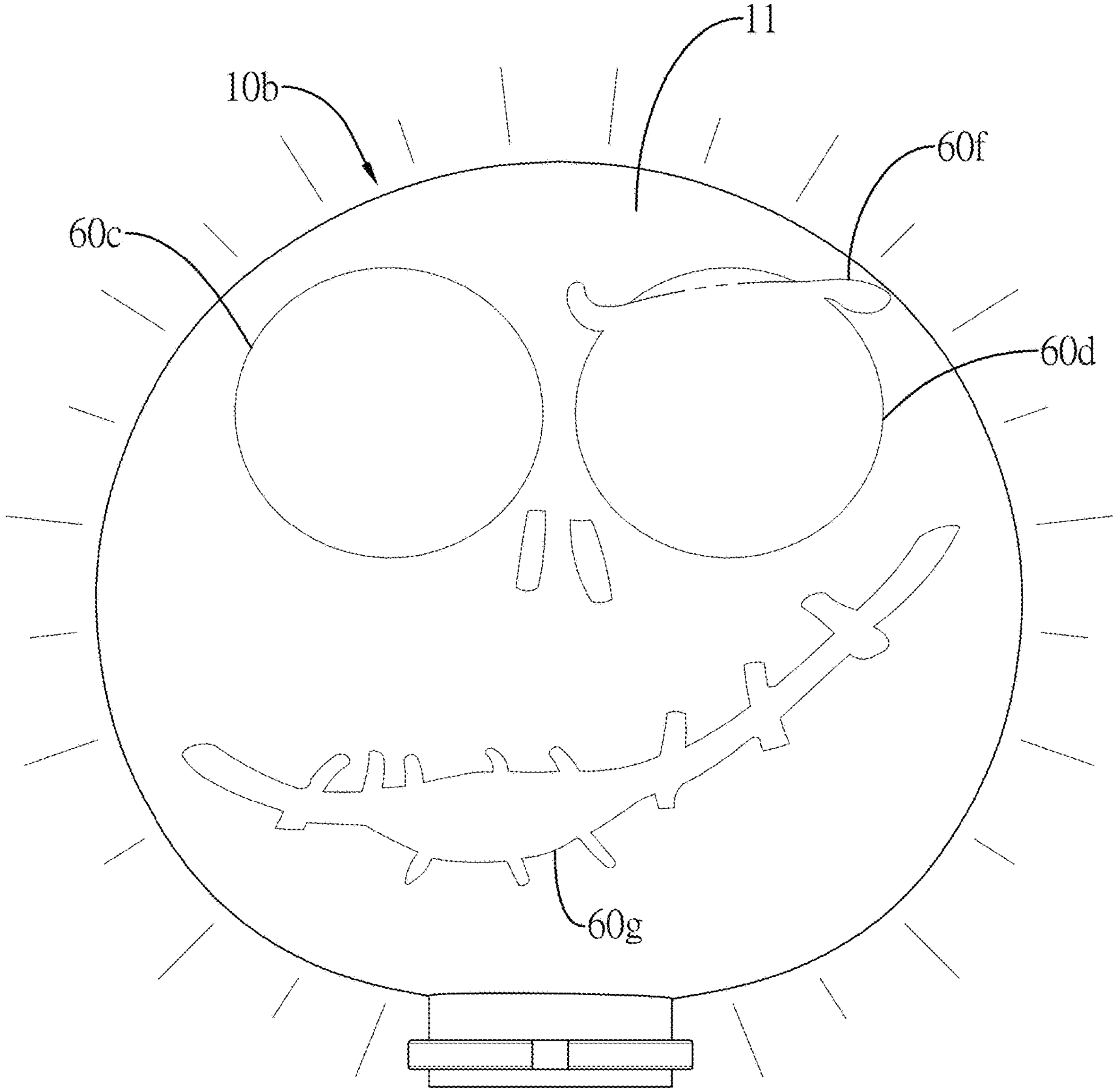
FIG. 18 is a front view of the second embodiment of the projecting decoration in FIG. 13, turned on and showing another lighting configuration.

Similarly, in a lighting configuration of a second embodiment in accordance with the present invention, as shown in FIGS. 15 to 17, the controller 40 controls the light units 22 corresponding to the hollowed-out graphic portions 311*c*, 311*d*, 311*e* to turn on and controls the light units 22 corresponding to the hollowed-out graphic portions 311*f*, 311*g* to turn off. Therefore, the outer shell 10*b* shows the projected FIGS. 60*c*, 60*d*, 60*e* corresponding to the hollowed-out graphic portions 311*c*, 311*d*, 311*e*. Or, in another lighting configuration of the second embodiment, as shown in FIG. 18, the controller 40 further controls the light units 22 corresponding to the hollowed-out graphic portions 311*f*, 311*g* to turn on, so that the outer shell 10*b* shows the projected FIGS. 60*c* to 60*g* corresponding to the hollowed-out graphic portions 311*c* to 311*g*. Alternatively, the controller 40 controls the light units 22 corresponding to the hollowed-out graphic portions 311*c*, 311*f*, 311*g* to turn on and controls the light units 22 corresponding to the hollowed-out graphic portions 311*d*, 311*e* to turn off. So, the outer shell 10*b* shows the projected FIGS. 60*c*, 60*f*, 60*g* corresponding to the hollowed-out graphic portions 311*c*, 311*f*, 311*g*, and the projected FIGS. 60*c*, 60*f*, 60*g* do not overlap with each other.

Figure 19:
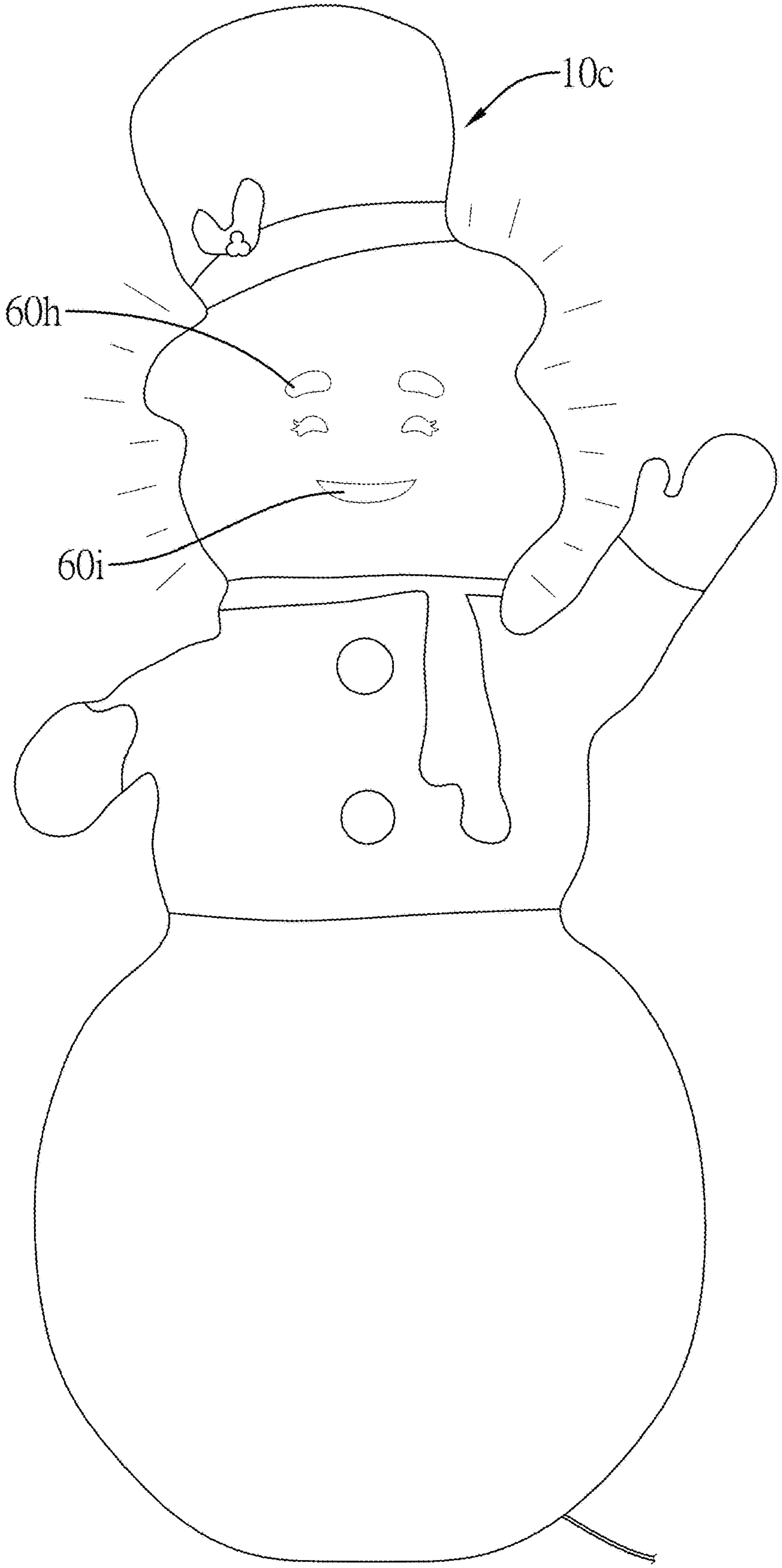

Besides, in a third embodiment of the projecting decoration in accordance with the present invention, as shown in FIG. 19, the controller 40 controls the light units 22 corresponding to the hollowed-out graphic portions 311*h*, 311*i* to turn on and controls the light unit 22 corresponding to the hollowed-out graphic portion 311*j* to turn off. So, the outer shell 10*c* shows the projected FIGS. 60*h*, 60*i* corresponding to the hollowed-out graphic portions 311*h*, 311*i*.

Furthermore, as shown in FIGS. 2 and 13, in the first and second embodiments of the projecting decoration, the outer shell 10*a*, 10*b* is made of rigid materials and comprises a front shell body 11 and a rear shell body 12. The front shell body 11 and the rear shell body 12 are connected to each other. The light assembly 20 and the light-blocking cover 30 are disposed in the front shell body 11 and the rear shell body 12, respectively. The base board 21 of the light assembly 20 is mounted at the rear shell body 12. The multiple light units 22 emit light toward the front shell body 11. Alternatively, as shown in FIGS. 19 and 20, in the third embodiment of the projecting decoration, the outer shell 10*c* is made of flexible materials. The projecting decoration comprises a blower 50 connected to the outer shell 10*c* and blows air into the outer shell 10*c* such that the outer shell 10*c* remains three-dimensionally shaped. Regardless that the outer shell 10*a*, 10*b*, 10*c* is made of flexible or rigid materials, the projecting decoration provides higher decorative effect and sense of fun. Therefore, consumers can choose from different embodiments of the projecting decoration based on decorative needs.

Figure 10:
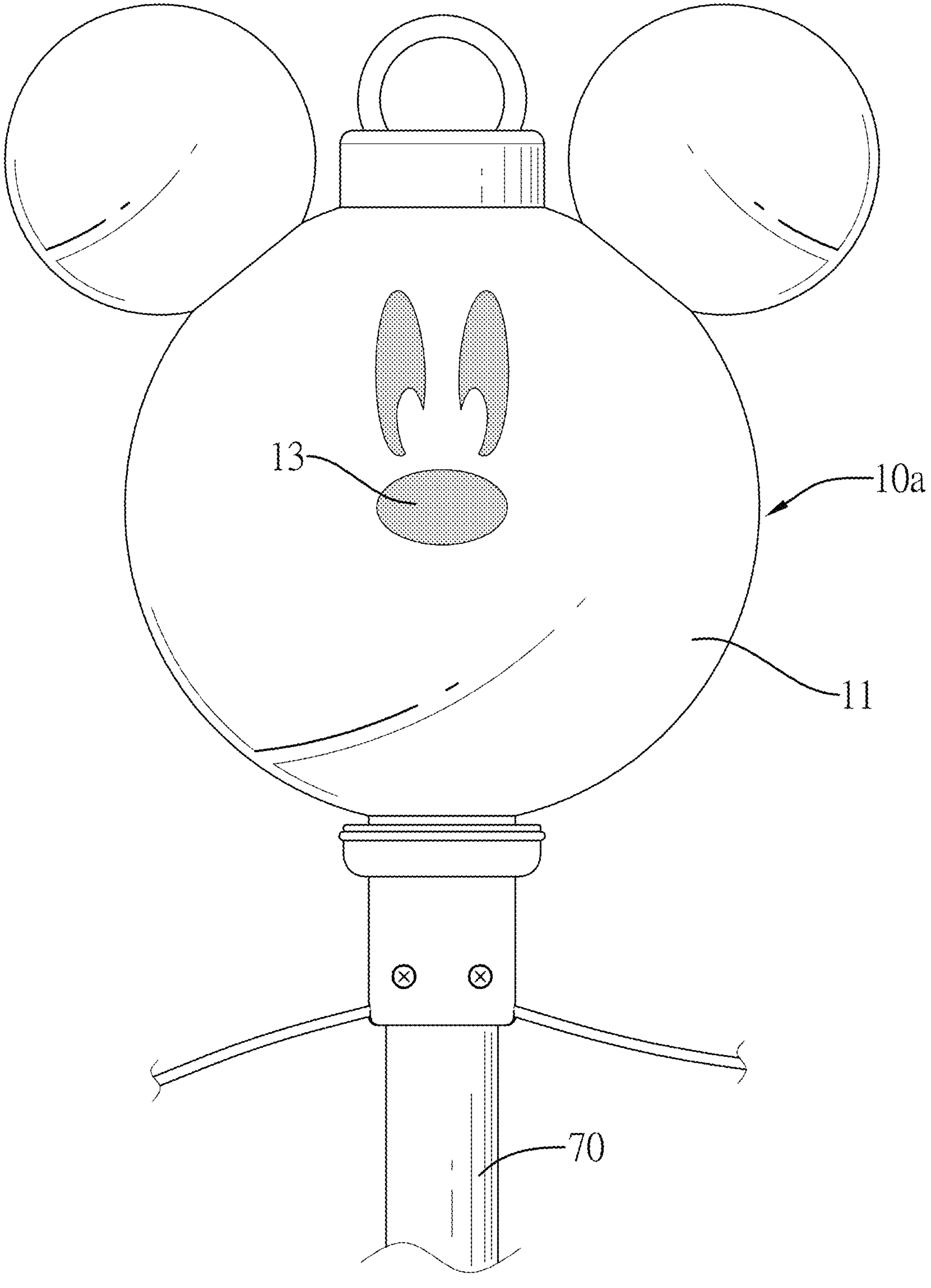
FIG. 10 is a front view of the outer shell of the first embodiment of the projecting decoration, having at least one painting portion.

Additionally, as shown in FIG. 10, the outer shell 10*a*, 10*b*, 10*c* has at least one painting portion 13 disposed at an external surface of the outer shell 10*a*, 10*b*, 10*c*. The at least one painting portion 13 can be presented on the external surface of the outer shell 10*a*, 10*b*, 10*c* by printing, adhesion, or being one-piece-formed with the outer shell 10*a*, 10*b*, 10*c*. Having the at least one painting portion 13 on the external surface of the outer shell 10*a*, 10*b*, 10*c* can enhance the decorative effect of the projecting decoration. Furthermore, when at least one of the multiple light units 22 emits light toward the corresponding hollowed-out graphic portion 311*a* to 311*j* to project the light to the outer shell 10*a*, 10*b*, 10*c*, at least one of the projected FIGS. 60*a* to 60*i* on the outer shell 10*a*, 10*b*, 10*c* and the at least one painting portion 13 overlap with each other. In other words, the at least one painting portion 13 cooperates with the projected FIGS. 60*a* to 60*i* of the hollowed-out graphic portion 311*a* to 311*j* shown on the outer shell 10*a*, 10*b*, 10*c* when the light unit 22 corresponding to the hollowed-out graphic portion 311*a* to 311*j* is turned on, thereby further enhancing the decorative effect and the sense of fun.

To sum up, the light assembly 20 and the light-blocking cover 30 are mounted inside the outer shell 10*a*, 10*b*, 10*c*. The controller 40 controls the multiple light units 22 of the light assembly 20 to emit light. The light passes through the multiple hollowed-out graphic portions 311*a* to 311*j* of the light-blocking cover 30 to be projected to the outer shell 10*a*, 10*b*, 10*c*. So, the outer shell 10*a*, 10*b*, 10*c* is lit up and shows the projected FIGS. 60*a* to 60*i*. Besides, the controller 40 controls a part of the multiple light units 22 to turn on while controlling another part to turn off, so that the outer shell 10*a*, 10*b*, 10*c* shows different projected FIGS. 60*a* to 60*i* of the hollowed-out graphic portions 311*a* to 311*j* corresponding to different light unit 22*s*, thereby enhancing the decorative effect and the sense of surprise and fun.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A projecting decoration comprising:

an outer shell being hollow internally and allowing light to pass through;

a light assembly mounted inside the outer shell and comprising
- a base board;
- multiple light units mounted at the base board and being controllable to emit light;

a light-blocking cover mounted inside the outer shell, mounted at the base board, and comprising
- a light-blocking body being hollow, connected to the base board of the light assembly, and having multiple hollowed-out graphic portions respectively corresponding to the multiple light units;
- at least one separating wall mounted inside the light-blocking body and disposed between each adjacent two of the multiple hollowed-out graphic portions;

a controller electrically connected to the light assembly and controlling a part of the multiple light units to turn on and another part of the multiple light units to turn off;

wherein when the controller turns on or off each one of the multiple light units, each one of the multiple light units emits light to a corresponding one of the multiple hollowed-out graphic portions; the light passes through said hollowed-out graphic portion to project to the outer shell, such that a projected figure corresponding to said hollowed-out graphic portion is shown on the outer shell; and wherein at least two of the projected figures on the outer shell corresponding to at least two of the multiple hollowed-out graphic portions overlap with each other.

2. The projecting decoration as claimed in claim 1, wherein the light-blocking body has
- an assembling opening;

the base board of the light assembly is mounted at the assembling opening of the light-blocking body;

the multiple light units extend into the light-blocking body; and each adjacent two of the multiple light units are separated by one of the at least one separating wall to separate the lights emitted by the multiple light units.

3. The projecting decoration as claimed in claim 2, wherein the controller has a sound module producing sounds when the multiple light units are turned on or turned off.

4. The projecting decoration as claimed in claim 3, wherein the outer shell comprises
- a front shell body and a rear shell body connected to each other;

the base board of the light assembly is mounted at the rear shell body; and the multiple light units emit light toward the front shell body.

5. The projecting decoration as claimed in claim 4, wherein the outer shell has at least one painting portion disposed at an external surface of the outer shell.

6. The projecting decoration as claimed in claim 5, wherein at least one of the projected figures on the outer shell corresponding to at least one of the multiple hollowed-out graphic portions and the at least one painting portion overlap with each other.

7. The projecting decoration as claimed in claim 3, wherein the outer shell is made of flexible materials;

the projecting decoration comprises
- a blower connected to the outer shell and blowing air into the outer shell such that the outer shell remains three-dimensionally shaped.

8. The projecting decoration as claimed in claim 7, wherein the outer shell has at least one painting portion disposed at an external surface of the outer shell.

9. The projecting decoration as claimed in claim 8, wherein at least one of the projected figures on the outer shell corresponding to at least one of the multiple hollowed-out graphic portions and the at least one painting portion overlap with each other.

10. The projecting decoration as claimed in claim 1, wherein the controller has a sound module producing sounds when the multiple light units are turned on or turned off.

11. The projecting decoration as claimed in claim 1, wherein the outer shell comprises
- a front shell body and a rear shell body connected to each other;

the base board of the light assembly is mounted at the rear shell body; and the multiple light units emit light toward the front shell body.

12. The projecting decoration as claimed in claim 1, wherein the outer shell is made of flexible materials;

the projecting decoration comprises a blower connected to the outer shell and blowing air into the outer shell such that the outer shell remains three-dimensionally shaped.

13. The projecting decoration as claimed in claim 1, wherein the outer shell has at least one painting portion disposed at an external surface of the outer shell.

14. The projecting decoration as claimed in claim 13, wherein at least one of the projected figures on the outer shell corresponding to at least one of the multiple hollowed-out graphic portions and the at least one painting portion overlap with each other.

* * * * *